United States Patent [19]

Maeda et al.

[11] Patent Number: 4,687,411
[45] Date of Patent: Aug. 18, 1987

[54] SPEED INCREASING GEAR FOR A CENTRIFUGAL COMPRESSOR

[75] Inventors: Kensaku Maeda; Teiichi Mochizuki, both of Tokyo, Japan

[73] Assignee: Ebara Corporation, Tokyo, Japan

[21] Appl. No.: 769,326

[22] Filed: Aug. 26, 1985

[30] Foreign Application Priority Data

Mar. 25, 1985 [JP] Japan .................................. 60-150

[51] Int. Cl.$^4$ ............................................. F01D 15/12
[52] U.S. Cl. ................................. 415/122 R; 415/171; 384/626; 384/538
[58] Field of Search ................... 415/122 R, 201, 104, 415/107, 96, 131, 132, 171; 384/626, 538, 519

[56] References Cited

U.S. PATENT DOCUMENTS

| | | | |
|---|---|---|---|
| 1,527,910 | 2/1925 | Parsons et al. | 415/104 |
| 1,973,554 | 9/1934 | Bentley | 415/107 |
| 2,973,894 | 3/1961 | Kimball et al. | 415/122 R |
| 3,425,760 | 2/1969 | Gordon | 384/583 |
| 3,635,579 | 1/1972 | Wood | 415/119 |
| 3,650,364 | 3/1972 | Osborne et al. | 415/175 |
| 3,826,587 | 7/1974 | Hornschuch | 415/122 R |
| 3,861,820 | 1/1975 | Hornschuch | 415/64 |
| 4,131,386 | 12/1978 | Mabe, Jr. | 415/171 |
| 4,309,144 | 1/1982 | Eggmann et al. | 415/107 |
| 4,507,926 | 4/1985 | Teckentrup et al. | 415/122 R |
| 4,533,294 | 8/1985 | Onal | 415/122 R |

FOREIGN PATENT DOCUMENTS

| | | | |
|---|---|---|---|
| 2928671 | 2/1980 | Fed. Rep. of Germany | 415/122 R |
| 2567568 | 1/1986 | France | 415/104 |
| 140201 | 10/1979 | Japan | 415/104 |
| 20861 | 2/1981 | Japan | 384/626 |

*Primary Examiner*—Robert E. Garrett
*Assistant Examiner*—John Kwon
*Attorney, Agent, or Firm*—Oblon, Fisher, Spivak, McClelland & Maier

[57] ABSTRACT

A centrifugal compressor has a speed increasing gear located between an impeller and a prime mover and driven by the prime mover to increase the impeller speed. The speed increasing gear includes an impeller shaft provided with a pinion and having the impeller attached to the foremost end portion thereof, a casing body having a divided face perpendicular to the shaft, and a bearing unit arranged at the rear end portion of the impeller shaft. The bearing unit has a thrust collar attached to the rear end of the impeller shaft, an inner thrust bearing formed adjacent to the inner side of the thrust collar, an outer thrust bearing formed adjacent to the outer side of the thrust collar, a radial bearing formed integral to the inner thrust bearing, a housing body combined with the radial bearing, enclosing the thrust collar, a housing cover combined with the housing body to hold the outer thrust bearing from outside, and a spacer sandwiched between the outer thrust bearing and the housing cover to adjust the clearance between the inner and outer thrust bearings, wherein said bearing unit is freely detachably attached to the casing body from a direction opposite to the prime mover.

7 Claims, 3 Drawing Figures

SPEED INCREASING GEAR FOR A CENTRIFUGAL COMPRESSOR

BACKGROUND OF THE INVENTION

The present invention relates to a centrifugal compressor and, more particularly, it relates to an improvement of the speed increasing gear which is a component of the centrifugal compressor.

Thrust and radial bearings for supporting the end portions of an impeller shaft are attached, independently of the other, to a casing for the speed increasing gear in the case of the conventional centrifugal compressor.

The lubrication oil supply means for the speed increasing gear employed by the conventional centrifugal compressor has been designed to have a spray nozzle attached to the casing of the speed increasing gear and a pipe connected from outside to the spray nozzle wherein lubrication oil is supplied through the pipe and sprayed at the gears through the spray nozzle, or to have a plurality of pinholes formed through that wall of the casing which faces the gear, and a large-diameter hole communicated with the pinholes wherein the lubrication oil is supplied through the large-diameter hole and jetted at the gears through the pinholes.

In the case of the conventional centrifugal compressor, however, it was difficult to stably support the impeller shaft unless both of the radial and thrust bearings were attached to the casing of the speed increasing gear. When arranged so, the clearance between the thrust bearing and collar on the impeller shaft in the axial direction thereof must be adjusted, with the impeller shaft assembled in the casing of the speed increasing gear, and the assembly of these components in a narrow space thus needed so careful attention. In addition, a lot of time and labor was needed in confirming the clearance dimension when these components were held assembled, then dismantling them to adjust the spacer, and assembling them again.

Further, the state of the lubrication oil which was being supplied to the gear was very difficultly confirmed through a narrow window after the whole of the speed increasing gear was assembled. When a trouble was caused, no adjustment could be done unless the casing of the speed increasing gear was dismantled. This needed an assembly and a lot of time and labor again.

SUMMARY OF THE INVENTION

The present invention is therefore intended to eliminate the above-mentioned drawbacks.

An object of the present invention is to provide a centrifugal compressor capable of extremely easily and reliably examining and adjusting the clearance of the thrust bearing at the step of component assembly before the whole of the compressor is assembled.

Another object of the present invention is to provide a centrifugal compressor capable of extremely easily and reliably examining and adjusting the state of lubrication oil, which is being supplied to the speed increasing gear, at the stage of component assembly.

According to the present invention, there can be provided a centrifugal compressor having an impeller, a driving means, and an speed increasing gear driven by the driving means to accelerate the impeller. The speed increasing gear includes a shaft provided with a pinion mounted outside of the bearing unit and to the foremost end of which the impeller is attached, a casing body having a divided face perpendicular to the axis of the shaft, and a bearing unit arranged at the axially rear end of the shaft. The bearing unit comprises a thrust collar attached to the rear end of the shaft, an inner thrust bearing located adjacent to the axially inner side of the thrust collar, opposite the rear end, to support a thrust load applied to the thrust collar, an outer thrust bearing located adjacent to the outer side of the thrust collar, opposite the inner side, to support the thrust load applied to the thrust collar, a radial bearing formed integral to the inner thrust bearing to support radial load applied to the rear end portion of the shaft, a housing body formed enclosing the thrust collar and releasably connected with the radial bearing, a housing cover connected with the housing body to hold the outer thrust bearing from an axial side thereof opposite said thrust collar, and a spacer located between the outer thrust bearing and the housing cover and contacted with them to adjust the axial clearance between the inner and the outer thrust bearings. The bearing unit is freely detachably attached to the casing body from an axial direction opposite to the driving means.

The bearing unit can further include a means for jetting lubrication oil to the small gear.

These and other objects as well as merits of the present invention will become apparent from the following detailed description with reference to the accompanying drawings.

DETAILED DESCRIPTION OF THE PREFERRED EMBODIMENT

Figure 1:
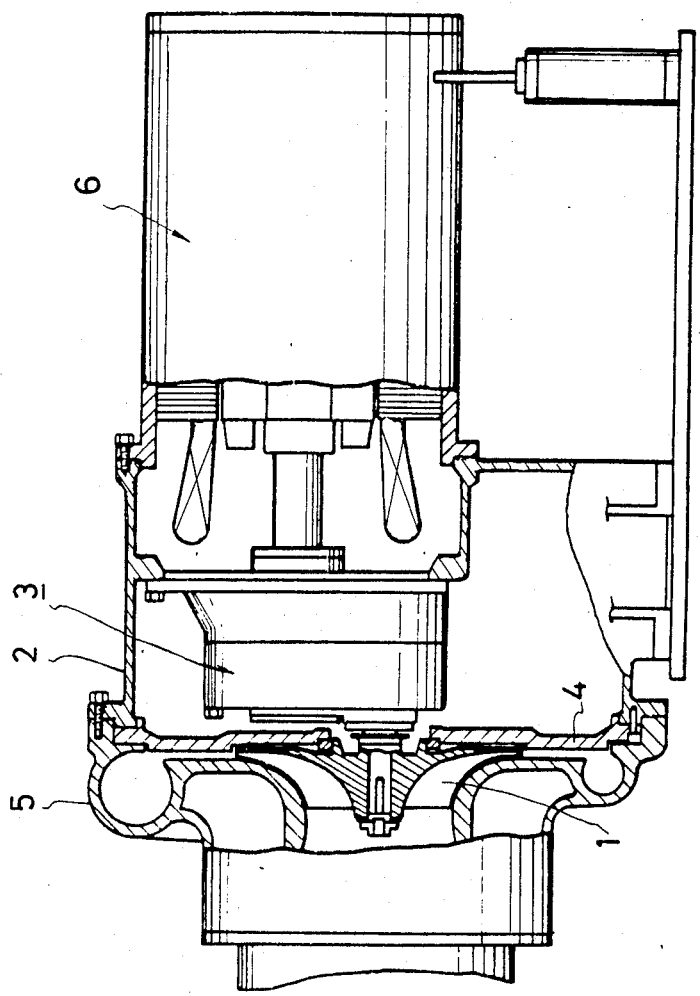
FIG. 1 is a sectional view showing the whole arrangement of an example of the centrifugal compressor according to the present invention wherein the sectional view is taken along the vertical line, showing the compressor partially broken.

In FIG. 1, a centrifugal compressor comprises an impeller 1, a casing body 2 for the compressor, a speed increasing gear 3, a back lid 4 for the impeller, a spiral casing 5, and a motor 6, where the driving rotation force of the motor 6 is transmitted to the impeller 1 through the speed increasing gear 3 and the impeller 1 is thus rotated at high speed to boost gas pressure.

The motor 6 is used as the prime mover in the case of this embodiment, but an engine, turbine or the like may be used instead.

Figure 2:
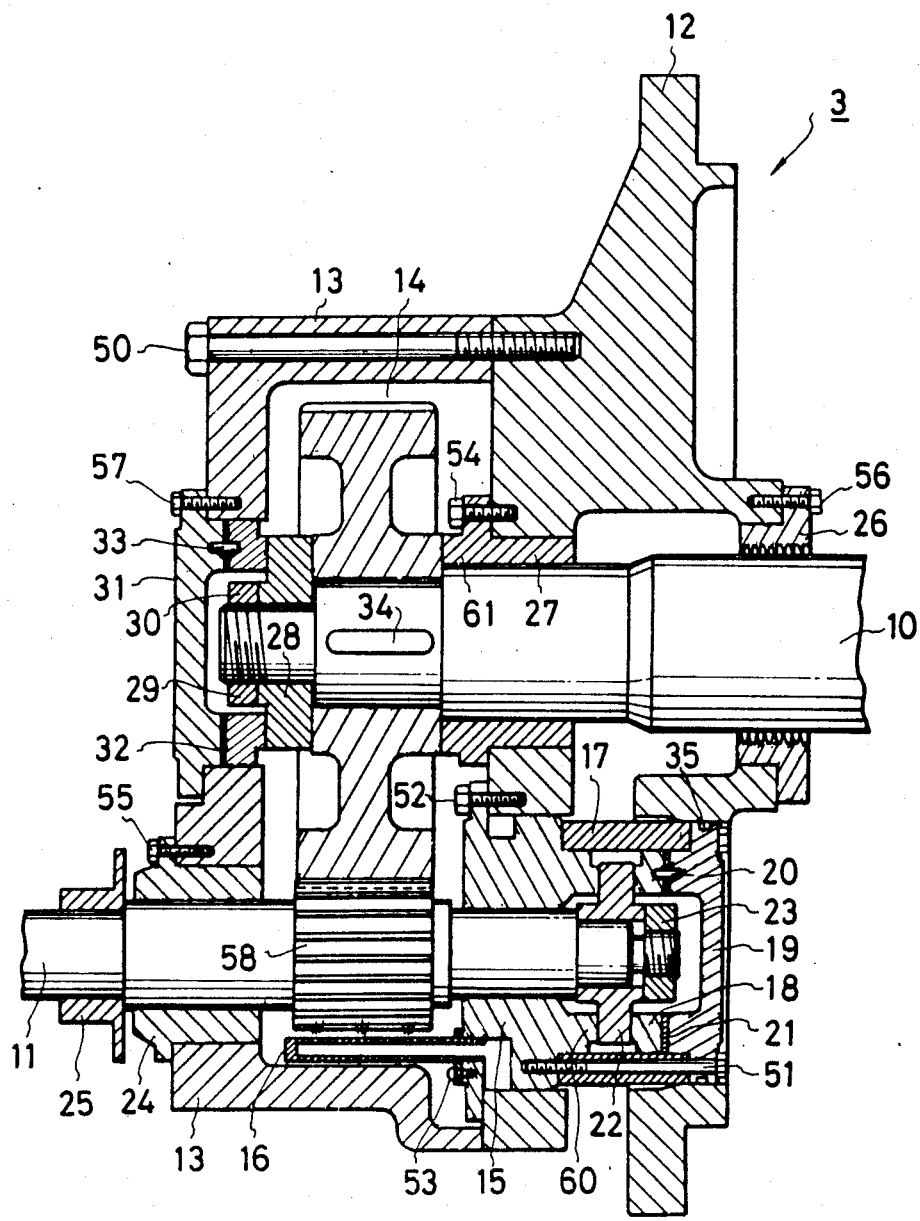
FIG. 2 is a vertical sectional view showing a speed increasing gear which is a component of the centrifugal compressor.
Figure 3:
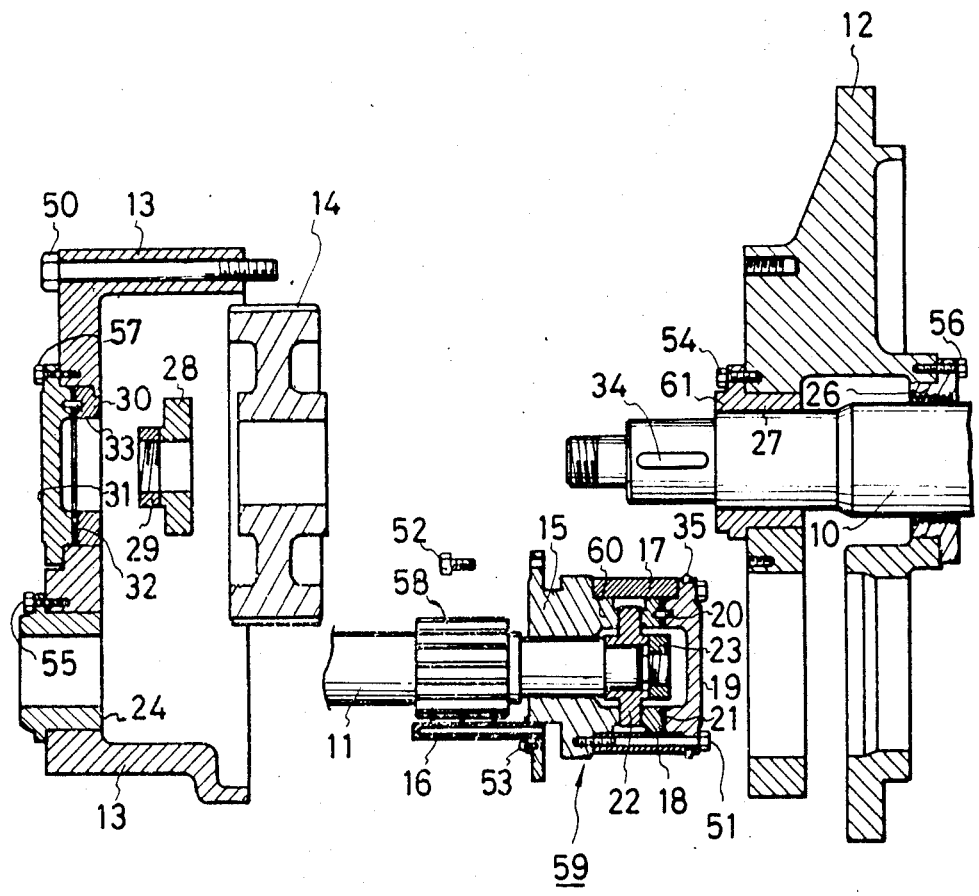
FIG. 3 is a vertical sectional view showing the speed increasing gear dismantled.

The structure of the speed increasing gear 3 will be described in detail, referring to FIGS. 2 and 3.

A casing of the speed increasing gear 3 is divided into a casing body 12 and an upper casing 13, which are combined with each other by means of a bolt 50 to support motor and impeller shafts 10 and 11 having rotational axes. The casing body 12 has a face perpendicular to the impeller shaft 11, as a divided face, and is located on the side of the motor 6. Mechanical processing such as boring is done under the condition that the casing body 12 and the upper casing 13 are combined integral to each other, and assembly accuracy is held in such a manner that position is determined by taper or knock pins at those faces of the casing body 12 and upper casing 13 where they are combined each other, so that the accuracy of engagement between large and small gears 14 and 58 can be established.

The radial load of the impeller shaft 11 to which the pinion 58 is attached is supported by a radial bearing 24 located on the impeller side and another radial bearing 15 located on a side opposite to the impeller. The thrust load of the impeller shaft 11 is supported in such a way that a thrust collar 22 fixed to the rear end of the impeller shaft 11 by means of a nut 23 is held by thrust bearings 18 and 60 located on both sides of the thrust collar 22. The thrust bearing 60 is formed integral to the radial bearing 15.

The radial bearing 15, thrust collar 22, thrust bearings 18, 60 and the like form a bearing unit 59, which will be described below, and attached, as a unit, to one end of the impeller shaft 11.

The bearing unit 59 comprises the radial bearing 15 located on the side opposite to the impeller, thrust collar 22, nut 23 by which the thrust collar 22 is attached to the impeller shaft 11, two thrust bearings 18, 60 located on both sides of the thrust collar 22, a housing body 17 for housing the thrust collar 22, a housing cover 19 for holding the thrust bearing 18 located on the shaft end side, a spacer 21 contacted with that face of the housing cover 19 which serves to hold the thrust bearing 18, and an oil spray pipe 16 attached to the radial bearing 15 by means of a bolt 53 to spray lubrication oil at the pinion 58. The thrust bearing 18 and spacer 21 are fixed, unrotatable, to the housing cover 19 by a pin 20. Reference numeral 35 denotes a sealing O-ring.

The housing cover 19 is attached to the radial bearing 15 (and thrust bearing 60, too) through the housing body 17 by means of a bolt 51.

The thrust bearing 60 may be made as a member different from the radial bearing 15. A stopper means is needed in this case to prevent the thrust bearing 60 from being rotated together with the thrust collar 22. In addition, the thrust bearing 60 is flanged and attached to the casing body 12 in this case.

The housing body 17 may be formed integral to the housing cover 19 or it may be formed integral to the radial or thrust bearing 15 or 60.

The spacer 21 is intended to adjust clearances between the thrust bearing 60 and the thrust collar 22 and between the thrust bearing 18 and the thrust collar 22. As shown in FIGS. 2 and 3, the spacer 21 is contacted with that face of the housing cover 19 which holds the thrust bearing 18. The spacer 21 may be contacted with the housing cover and body 19 and 17 between them or with the housing body 17 and radial bearing 15 between them.

The thrust bearings 18 and 60 may be of the tilting pad type or they may be of the dynamic pressure type in which groove and notch are used.

The bearing unit which has been attached integral to the rear end of the impeller shaft 11 is inserted into an opening of the casing body 12, which is located on the prime mover side, from a side opposite to the prime mover and fixed to the casing body 12 by a bolt 52 which passes through the flange of the radial bearing 15, thereby receiving the thrust and radial loads applied to the thrust collar 22 and the rear end of the impeller shaft 11, respectively.

The radial load of the impeller shaft 11 located on the impeller side is supported by the radial bearing 24 which is attached to the upper casing 13 by a bolt 55. Reference numeral 25 represents a slinger.

The gear 14 is attached to the motor shaft 10 through a key 34. The radial load of the motor shaft 10 is supported by a radial bearing 27 which is attached to the casing body 12 by a bolt 54.

A thrust collar 28 is attached to the foremost end of the motor shaft 10 by a shaft nut 29. Thrust load which is reverse to the direction of the motor 6 is supported by a thrust bearing 30 which is contacted with the thrust collar 28. Thrust load which is in the direction of the motor 6 is supported by a thrust bearing 61 which is contacted with the boss of the gear 14.

The thrust bearing 30 is attached, unrotatable, to a cover 31 through a spacer 32 by a pin 33 and the cover 31 is fixed to the upper casing 13 by a bolt 57. Reference numeral 26 represents a shaft seal part attached to the casing body 12 by a bolt 56.

It will be described with reference to FIG. 3 how the speed increasing gear 3 which has the above-described arrangement is assembled.

Before the impeller shaft 11 is arranged inside the casing of speed increasing gear, the bearing unit 59 is previously attached to the rear end portion of the impeller shaft 11. The bearing unit 59 is assembled as follows:

The impeller shaft 11 is inserted into the shaft opening of the radial bearing 15 and the thrust collar 22 is attached to the rear end of the impeller shaft 11 by the shaft nut 23. The housing body 17 is attached to the radial bearing 15 and the thrust bearing 18 is further attached thereto from the shaft end side. The pin 20 is attached to the thrust bearing 18 to prevent the thrust bearing from being rotated. The spacer 21 is then attached to the back face of the thrust bearing 18 and the housing cover and body 19 and 17 are fixedly attached to the radial bearing 15 by the bolt 51.

This assembling can be achieved more easily and efficiently when that side of the impeller shaft 11 to which the impeller is attached is put down but the housing cover 19 up.

After the cover 19 is attached, the oil spray pipe 16 is attached to a side of the radial bearing 15 by the bolt 53. The oil hole in the oil spray pipe 16 is communicated with another oil hole in the radial bearing 15, when assembled.

The erected impeller shaft 11 is laid to measure the clearances between the thrust bearing 18 and the thrust collar 22 and between the thrust bearing 60 and the thrust collar 22, and the thickness of the spacer 21 is adjusted to make the clearances optimum. When the thickness of the spacer 21 is adjusted, the spacer 21 can be taken out only by removing the housing cover 19. Therefore, the process of changing the spacer 21 to one of desired thickness, or adding and removing the spacer 21 can be made much easier.

Lubrication oil is then supplied to the oil spray pipe 16 and oil spraying test is done. The state under which the oil is being sprayed can be more easily and reliably observed this time without any hindrance. In addition, adjustment and correction of any unfitted parts can be done extremely more easily, with the housing cover 19 removed.

When adjustments relating to the clearances of the thrust bearings relative to the thrust collar and the lubrication oil spraying mechanism are finished the bearing unit 59 which has the high speed impeller shaft 11 is inserted into the opening of the casing body 12 from the side opposite to the prime mover and fixedly attached to the casing body by the bolt 52.

The low speed motor shaft 10 is introduced into the casing of the speed increasing gear as follows:

The shaft seal part 26 and radial bearing 27 are fixed to the shaft opening of the casing body 12 of the speed increasing gear by means of the bolts 56 and 54, respectively. The motor shaft 10 is inserted into the shaft openings of the fixed shaft seal part 26 and radial bearing 27. Under this state, the bearing unit 59 of the high speed impeller shaft 11 is attached to the casing body 12, the gear 14 to the motor shaft 10 through the key 34, and the thrust collar 28 then to the motor shaft 10 by the shaft nut 29.

The upper casing 13 is attached to the casing body 12 by the bolt 50. It may be arranged this time that the thrust bearing 30, cover 31 and radial bearing 24 for the impeller shaft 11 have been attached to the upper casing 13, but for the purpose of preventing the bearing face from being damage at the time of assembly, it is better to attach these parts to the upper casing 13 after the upper casing 13 is firstly attached to the casing body 12. When the thrust bearing 30 is attached, the spacer 32 is used to adjust the clearance between the thrust bearing 30 and the thrust collar 28. The clearance between the thrust bearing 61 and the boss of the gear 14 can also be adjusted by the spacer 32.

The following particularly remarkable effects can be achieved according to the present invention:

(1) The clearance adjustment for the thrust bearings of the impeller shaft 11 can be made much easier and more reliable.

The bearing unit 59 when assembled is small in size and light in weight. Since the clearance of the thrust bearings relative to the thrust collar can be confirmed, leaving the bearing unit 59 so assembled as to make it easier to see the assembled bearing unit 59 from outside, the process of confirming the clearance can be made extremely easier and more reliable and finished in a shorter time period. Further, the process of changing, adding and removing the spacer 21 to adjust the thickness of the spacer 21 can be achieved more easily and reliably in the shorter time period only by removing an extremely small number of parts. When the spacer 21 is attached to the face of the housing cover 19, for example, only the housing cover 19 may be removed. Even when the spacer 21 is attached to the housing body 17 and radial bearing 15 between them, only the housing cover and body 19 and 17 may be removed at the utmost.

As compared with the conventional case where the whole compressor was assembled, the clearance for the thrust bearings was confirmed, the compressor was dismantled again, and the spacer was adjusted with difficulty in a narrow space, the processes in the case of the present invention can be made much easier without wasting any time and labor and the clearance for the thrust bearings can be made optimum with higher reliability. Further, the clearance for the thrust bearings can be adjusted independently of the assembly of the centrifugal compressor itself, and at the time of having assembled the whole of the compressor, it is unnecessary to pay any attention to the adjustment of the clearance for the thrust bearings of the impeller shaft, thereby enabling process efficiency and product reliability to be enhanced.

(2) Even in the case where the spray pipe for spraying lubrication oil is incorporated into the bearing unit, this unit can be made smaller in size and an lighter in weight, and oil spraying test can be conducted, leaving the bearing unit so assembled as to make it easier to see the assembled bearing unit from outside, so that the process of confirming and adjusting the oil spraying operation and changing and repairing the spray pipe can be achieved much more easily and reliably in a shorter time period.

As compared with the conventional case where the whole compressor was assembled, the operation was not easy examined because the assembled compressor made it difficult to see the inside of the compressor from outside, and the adjusting process was done in a narrow space, the processes in the case of the present invention can be made much easier without wasting any time and labor. In addition, the lubrication oil spray can be reliably kept in good condition and the process of examining and adjusting the lubrication oil spray can be achieved without dismantling the compressor itself, and when the compressor is once assembled, it is unnecessary to pay any attention to the operation of spraying the lubrication oil, thereby enabling process efficiency and product reliability to be enhanced.

What is claimed as new and desired to be secured by Letters Patent of the United States is:

1. A centrifugal compressor comprising:
    an impeller,
    a speed increasing gear for increasing a speed of rotation of the impeller, and
    a driving means for driving the speed increasing gear,
    said speed increasing gear located between the impeller and the driving means and having the impeller attached to the foremost end thereof, said speed increasing gear including a shaft having a rotational axis and provided with a pinion, a casing body provided with a divided face perpendicular to said axis, and a bearing unit arranged at an axially rear end portion of the shaft, and
    said bearing unit including a thrust collar attached to the rear end of the shaft, an inner thrust bearing arranged adjacent to an inner axial side of the thrust collar opposite said rear end to support a thrust load applied to the thrust collar, an outer thrust bearing arranged adjacent to an outer axial side of the thrust collar axially opposite to said inner side to support a thrust load applied to the thrust collar, a radial bearing formed integral to the inner thrust bearing to support a radial load applied adjacent to the rear end of the shaft, a housing body releasably connected with the radial bearing and enclosing the thrust collar, a housing cover connected with the housing body to support the outer thrust bearing from an axial side thereof opposite said thrust collar, and a spacer sandwiched between the outer thrust bearing and the housing cover to adjust the axial clearance between the inner and outer thrust bearings, wherein said bearing unit is freely detachably attached to the casing body from an axial direction opposite to the driving means, and wherein said pinion is positioned exterior to said bearing unit.

2. A centrifugal compressor according to claim 1 wherein said housing body and cover are made of same material and formed integral to each other.

3. A centrifugal compressor according to claim 1 wherein said radial bearing is formed as a member different from and independent of said inner thrust bearing.

4. A centrifugal compressor according to claim 1 wherein a means for spraying lubrication oil at the pinion is further attached to the bearing unit.

5. A centrifugal compressor comprising:
   an impeller,
   a speed increasing gear connected to the impeller to increase a speed of rotation of the latter, and
   a driving means connected to the speed increasing gear to drive the latter,
   said speed increasing gear located between the impeller and the driving means and having a casing body, a gear located at the foremost end thereof and attached to the casing body, a first shaft rotated about an axis thereof by the driving means, a second shaft having an axis of rotation parallel to the axis of said first shaft, said second shaft being attached to the casing body and provided with a small gear engaged with the large gear to rotate at high speed, and said second shaft being connected to the impeller at the foremost end thereof, said speed increasing gear further including a bearing unit for supporting an axially rear end portion of the second shaft, and
   said bearing unit including a thrust collar attached to the rear end of the second shaft, and inner thrust bearing located adjacent to an inner axial side of the thrust collar opposite side rear end to support a thrust load applied to the thrust collar, an outer thrust bearing located adjacent to an outer axial side the thrust collar axially opposite to said inner side to support a thrust load applied to the thrust collar, a radial bearing formed integral to the inner thrust bearing to support a radial load applied adjacent to the rear end of the second shaft, a housing body releasably connected with the radial bearing and enclosing the thrust collar, a housing cover connected with the housing body to hold the outer thrust bearing from an axial side thereof opposite side thrust collar, a spacer sandwiched between the outer thrust bearing and the housing cover to adjust the axial clearance between the inner and outer thrust bearings, and a spray tube attached to the radial bearing to spray lubrication oil at the pinion, wherein said bearing unit is freely detachably attached to the casing body from an axial direction opposite to the driving means, and wherein said gears are located exterior to said bearing unit.

6. A centrifugal compressor according to claim 5 wherein said housing body and cover are formed as a same member and integral to each other.

7. A centrifugal compressor according to claim 5 wherein said radial bearing is formed as a member different from and independent of said inner thrust bearing.

* * * * *